United States Patent
Lehtonen et al.

(10) Patent No.: US 9,065,934 B2
(45) Date of Patent: Jun. 23, 2015

(54) SYSTEM, AN APPARATUS, A CLIENT DEVICE AND A METHOD FOR PROVIDING PRICING INFORMATION

(75) Inventors: Rami Lehtonen, Toijala (FI); Kimmo Kivirauma, Kangasala As (FI)

(73) Assignee: TeliaSonera AB, Stockholm (SE)

( * ) Notice: Subject to any disclaimer, the term of this patent is extended or adjusted under 35 U.S.C. 154(b) by 36 days.

(21) Appl. No.: 13/537,818

(22) Filed: Jun. 29, 2012

(65) Prior Publication Data
US 2013/0005298 A1  Jan. 3, 2013

(30) Foreign Application Priority Data
Jun. 30, 2011  (EP) .................................. 11397516

(51) Int. Cl.
| | |
|---|---|
| H04M 3/42 | (2006.01) |
| H04M 15/28 | (2006.01) |
| H04M 15/00 | (2006.01) |
| H04W 4/24 | (2009.01) |
| H04M 1/2745 | (2006.01) |

(52) U.S. Cl.
CPC ........ *H04M 15/28* (2013.01); *H04M 1/274508* (2013.01); *H04M 15/83* (2013.01); *H04M 15/8351* (2013.01); *H04M 2215/8108* (2013.01); *H04M 2215/82* (2013.01); *H04W 4/24* (2013.01)

(58) Field of Classification Search
USPC .................................................. 455/406, 405
See application file for complete search history.

(56) References Cited

U.S. PATENT DOCUMENTS

| | | | | |
|---|---|---|---|---|
| 5,303,297 | A * | 4/1994 | Hillis ............................ | 455/406 |
| 2003/0040297 | A1* | 2/2003 | Pecen et al. ................... | 455/406 |
| 2007/0149252 | A1 | 6/2007 | Jobs et al. | |
| 2008/0235242 | A1 | 9/2008 | Swanburg et al. | |
| 2010/0250108 | A1 | 9/2010 | Tourunen et al. | |

FOREIGN PATENT DOCUMENTS

| | | |
|---|---|---|
| EP | 1 988 699 | 11/2008 |
| WO | WO 00/18104 | 3/2000 |
| WO | WO 2005/046197 | 5/2005 |

* cited by examiner

*Primary Examiner* — Charles Appiah
*Assistant Examiner* — Randy Peaches
(74) *Attorney, Agent, or Firm* — Cozen O'Connor

(57) ABSTRACT

The invention relates to a solution for providing pricing information to a client device. The pricing information is delivered from the operator system to the client device by means of a network connection. The pricing information relates to at least one contact information appearing in the client device. The client device is then configured to display the pricing information relating to the contact information in the client device.

20 Claims, 15 Drawing Sheets

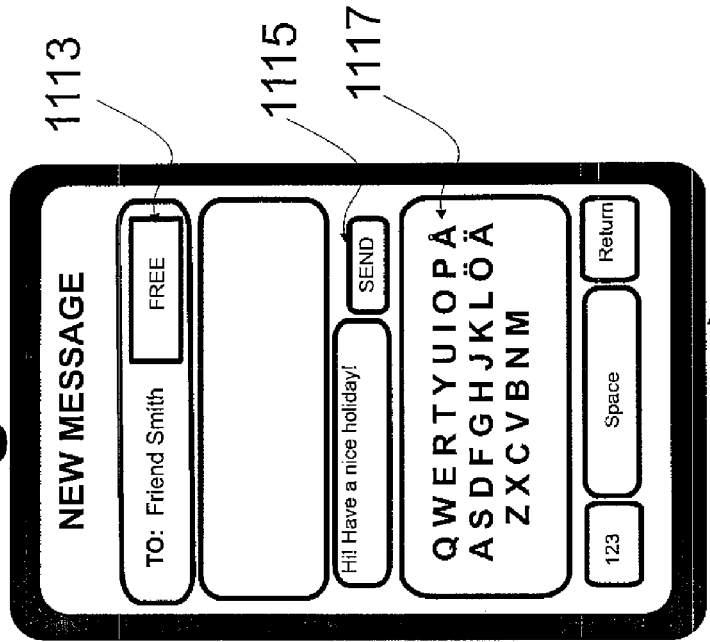
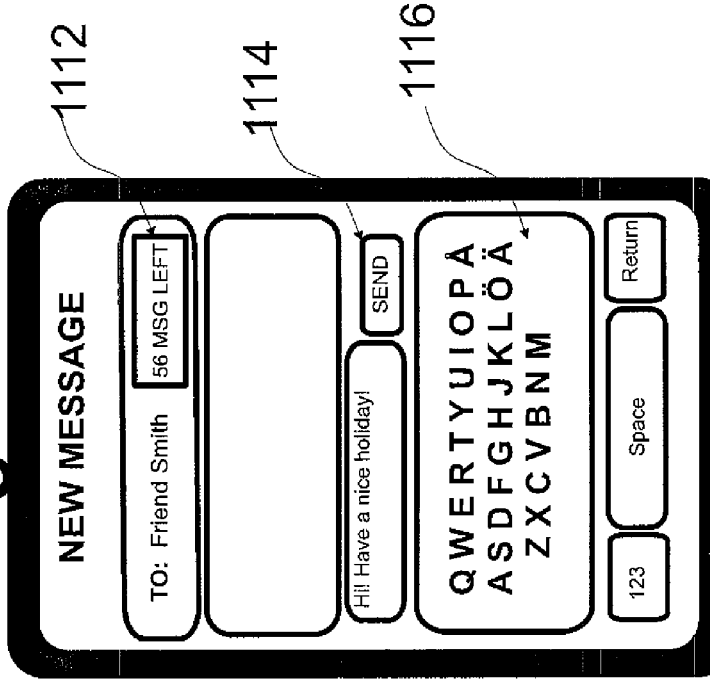

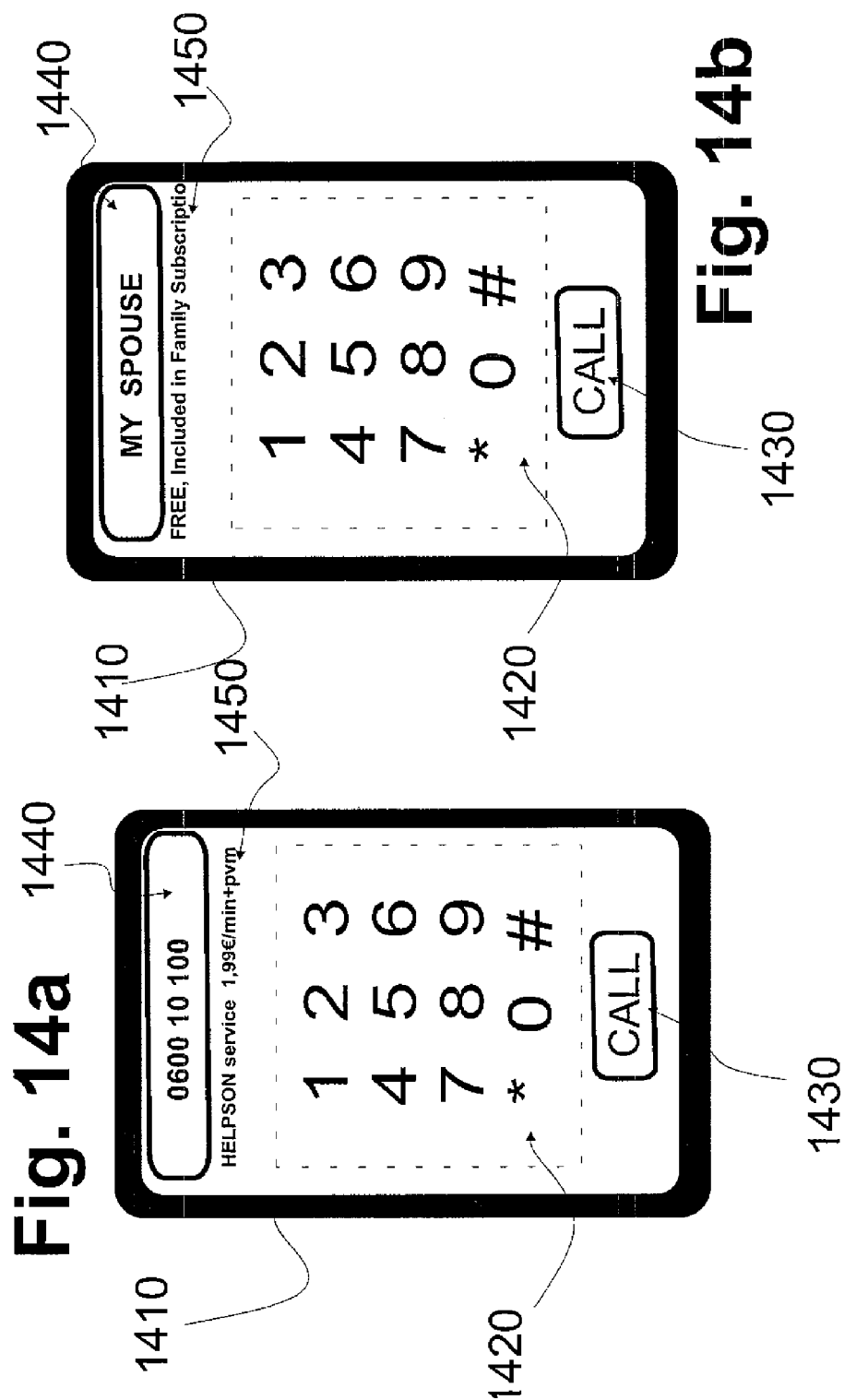

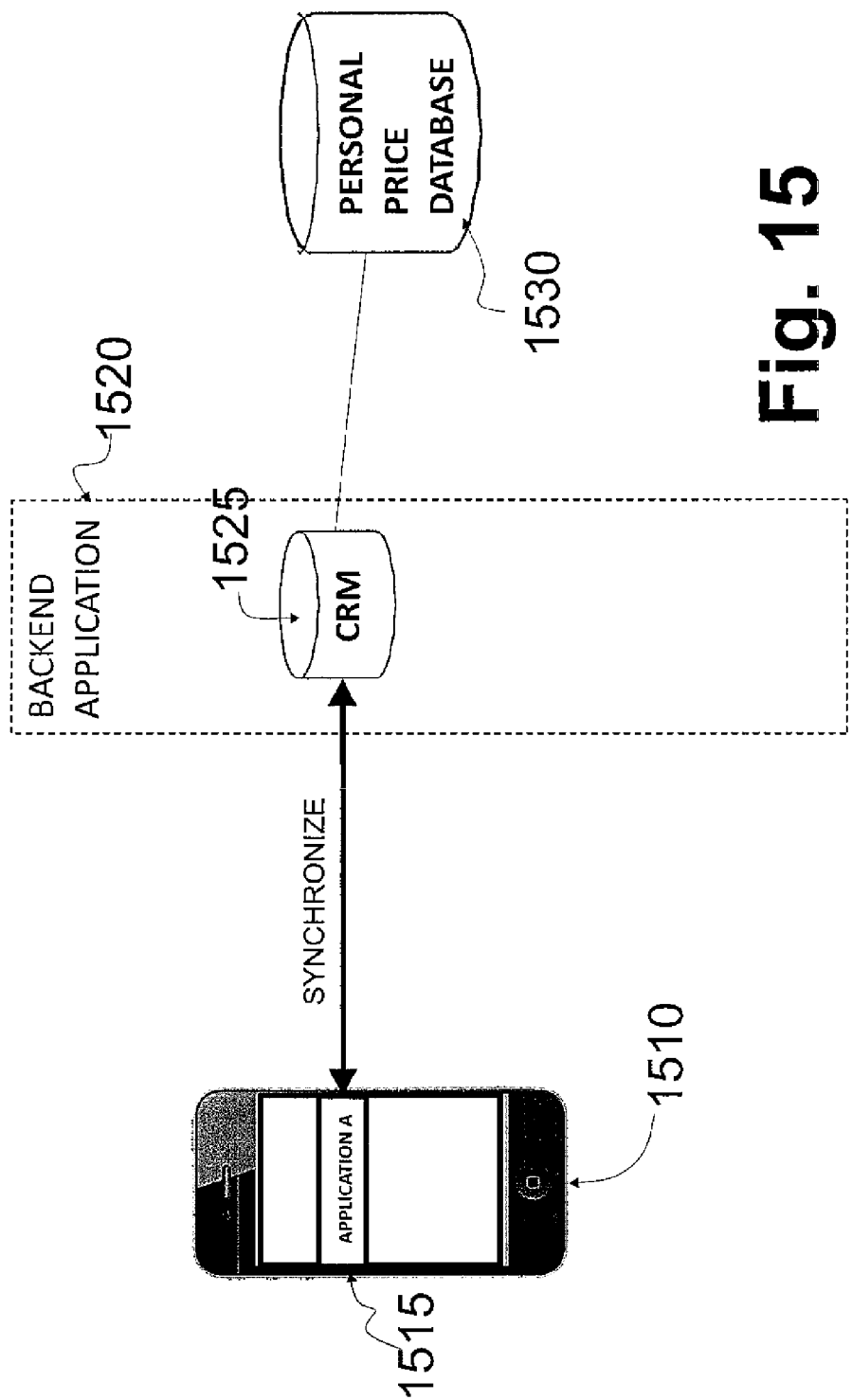

SYSTEM, AN APPARATUS, A CLIENT DEVICE AND A METHOD FOR PROVIDING PRICING INFORMATION

RELATED APPLICATIONS

This application claims priority to EP Application No. 11397516, filed 30 Jun. 2011, which is hereby incorporated by reference in its entirety.

FIELD OF THE INVENTION

The present invention relates to a system, to an apparatus, to a client device and to a method for providing pricing information.

BACKGROUND OF THE INVENTION

When a user becomes a subscriber to a mobile operator network, the user may have an idea on how much calling will cost under the subscription. The user may be aware of the costs of messages and costs of operator's internal calls. Similarly, the user may have selected a certain amount of minutes/messages to be included in a subscription plan with fixed monthly rate. However, the user cannot currently know, at the time of making the call, whether a certain contact would be included in the subscription plan. It is not neither possible to know, how many minutes and/or messages there are still left in the subscription plan, and what would the minutes/messages exceeding the plan cost. In addition, there are certain numbers, where special pricing is applied. Communication to company numbers, special service numbers and roaming/VoIP cases are not often included into the subscription plan. Further, a number transfer from one operator to the other causes doubts about prices. The telephone number comprises an operator code in the beginning of the number, which operator code indicates the operator to which the number was at first subscribed. However, the users have a possibility to bring the number along, when subscribing to another operator. Therefore, the number's operator code does not necessarily match the operator the number is currently subscribed to. Therefore, the user does not know, whether the number s/he is calling to belongs to the same operator or to another operator, which may affect on prices of the call. For all these reasons, a user may appreciate knowing the price of a call in advance, i.e. before making any call.

There are solutions for informing the user on the price of the call. For example, publication U.S. Pat. No. 7,206,570 discloses a method for providing price information to subscribers. When a subscriber dials a call number, s/he obtains information on the rate to expect for a communication by means of short messaging service (SMS). The solution provides means for informing the user if the actual price is not the same as the price to be expected. Another example is a Viber system that allows free calls to other Viber users. The Viber users are indicated in the phone book so that the user will know, to whom free calls can be made.

However, these solutions are aimed for a limited exploitation, and therefore they do not take into account the numerous pricing options (company numbers, service numbers, roaming, messages, fixed rate) that can be found from the current communications technology. These solutions are neither capable of displaying pricing information for an arbitrary contact in a contact book so that a user would notice immediately, what a call would cost.

Thus, there is a need for a solution that would indicate the user instantly when contacting what kind of pricing model is applied to a certain contact.

SUMMARY OF THE INVENTION

Now there has been invented a system, an apparatus, a client device and a method for providing pricing information. The system, the apparatus, the client device and the method are characterized by what is stated in the independent claims. Various embodiments of the invention are disclosed in the dependent claims.

According to a first aspect, a system comprises a client device and an operator system. Said client device and said operator system comprises a network connection therein between. The client device comprises at least one contact information, wherein the system is configured to deliver pricing information from the operator system to the client device by means of the network connection, said pricing information relating to said at least one contact information. The system is also configured to display said pricing information in said client device.

According to an embodiment, the system is further configured to display the pricing information together with the contact information.

According to an embodiment, the system further comprises a backend application configured to retrieve the pricing information from the operator system.

According to an embodiment, the contact information is a contact number or a connection type.

According to an embodiment, the connection type is a phone call, a short message, a multimedia message or a data transfer.

According to an embodiment, the client device is configured to form a pricing query and to transmit the pricing query to the operator system.

According to an embodiment, the system is further configured to derive pricing information for contacts appearing in a phonebook application of the client device by means of received pricing information.

According to an embodiment, the system is further configured to derive pricing information for a contact appearing in a communication application (messaging or dialing) of the client device.

According to an embodiment, the system is further configured to synchronize the client device with the operator system in order to deliver the pricing information.

According to a second aspect, an apparatus comprises a network connection to a client device, said client device comprising at least one contact information. The apparatus is configured to deliver a pricing information to the client device by means of the network connection, said pricing information relating to said at least one contact information.

According to a third aspect, a client device comprises a network connection to an operator system, said client device comprising at least one contact information. The client device is configured to receive a pricing information from the operator system by means of the network connection, said pricing information relating to said at least one contact information, and to display said pricing information relating to said at least one contact information.

According to an embodiment, the client device comprises a network connection to the operator system via a backend application.

According to an embodiment, the client device is configured to form a pricing query and to transmit the pricing query to the operator system.

According to an embodiment, the client device is further configured to derive pricing information for contacts appearing in a phonebook application of the client device by means of received pricing information.

According to an embodiment, the client device is further configured to derive pricing information for a contact appearing in a communication application (messaging or dialing) of the client device.

According to an embodiment, the client device is further configured to upgrade a pricing database of a user of the client device or of another user being reachable via the contact information According to a fourth aspect, a method for providing pricing information to a client device from an operator system by means of a network connection, said client device comprising at least one contact information, comprises: delivering a pricing information query from the operator system to the client device by means of the network connection, said pricing information relating to said at least one contact information, and displaying said pricing information relating to said at least one contact information in said client device.

According to an aspect, a client device comprises at least one contact information, a processor, a memory including computer program code, wherein the memory and the computer program code are configured to, with the processor, cause the apparatus to perform at least the following: receiving a pricing information from the operator system by means of the network connection, said pricing information relating to said at least one contact information, and to display said pricing information relating to said at least one contact information.

The pricing information can comprise information on the status of the pricing database (i.e. how much pre-paid money there is still left for making a contact), status of the subscription plan (i.e. how many messages and calls there are left in the subscription plan), a price of a call, a price of a message or a price of a data transfer. Therefore, a price information being delivered is not necessarily only a price (i.e. a value of something), but can be an information on amount of free messages or free calls and also information on persons or contacts being mentioned in a subscription plan.

DESCRIPTION OF THE DRAWINGS

In the following, various embodiments of the invention will be described in more detail with reference to the appended drawings, in which

FIG. 11a, 11b show an example of a user interface for creating a message with pricing information;

FIG. 14a, 14b show an example of a dial pad with pricing information; and

FIG. 15 shows an example for delivering pricing information to the client device.

DETAILED DESCRIPTION OF THE EMBODIMENTS

In the following, several embodiments of the invention will be described in the context of mobile communications and smartphones. It is to be noted, however, that the invention is not limited to mobile communications. In fact, the different embodiments may be utilized widely in any environment where communications via intelligent devices (e.g. computers and smartphone) is possible.

When subscribing a mobile telephone number from an operator, a subscription account is created. Charging of the subscription can be made monthly with fixed rate or depending on the usage of the subscription. Prices of calls may vary between operators but generally inter-operator calls (i.e. call from between users being subscribed to the same operator) are of lower cost than calls to other operator. The subscription account comprises information on the subscriber but very often also a subscription plan that may have a monthly fixed rate. The subscriber may define, how many minutes are included into the subscription plan, how many messages (text and/or multimedia) and how much data can be transferred within the subscription plan. In addition, the subscriber may define whether there are contacts (e.g. family, friends) that should be charged differently when being contacted.

All the contacts cannot, however, be suited within the subscription plan. For example, service numbers, special company numbers and foreign numbers are often left out from the subscription plan, because they usually have an additional cost besides the network fee. The present solution provides means to inform the user on the cost of the call/message/data transfer regardless of type of the contact. The present solution helps to know exactly what a call or a message to a certain contact would cost. In addition, by means of the present solution, the user will know exactly how many messages there are still left in the subscription plan and whether sending a message to a particular number/contact can be included in the subscription plan. Further, it is possible to know how much data the user has consumed in the mobile broadband plan, and how much there is still available for the rest of the period (e.g. a month). The user may also see recommended subscription upgrade options directly calculated based on user's individual needs. The user may also purchase the upgrade directly from the contact book.

Figure 1:
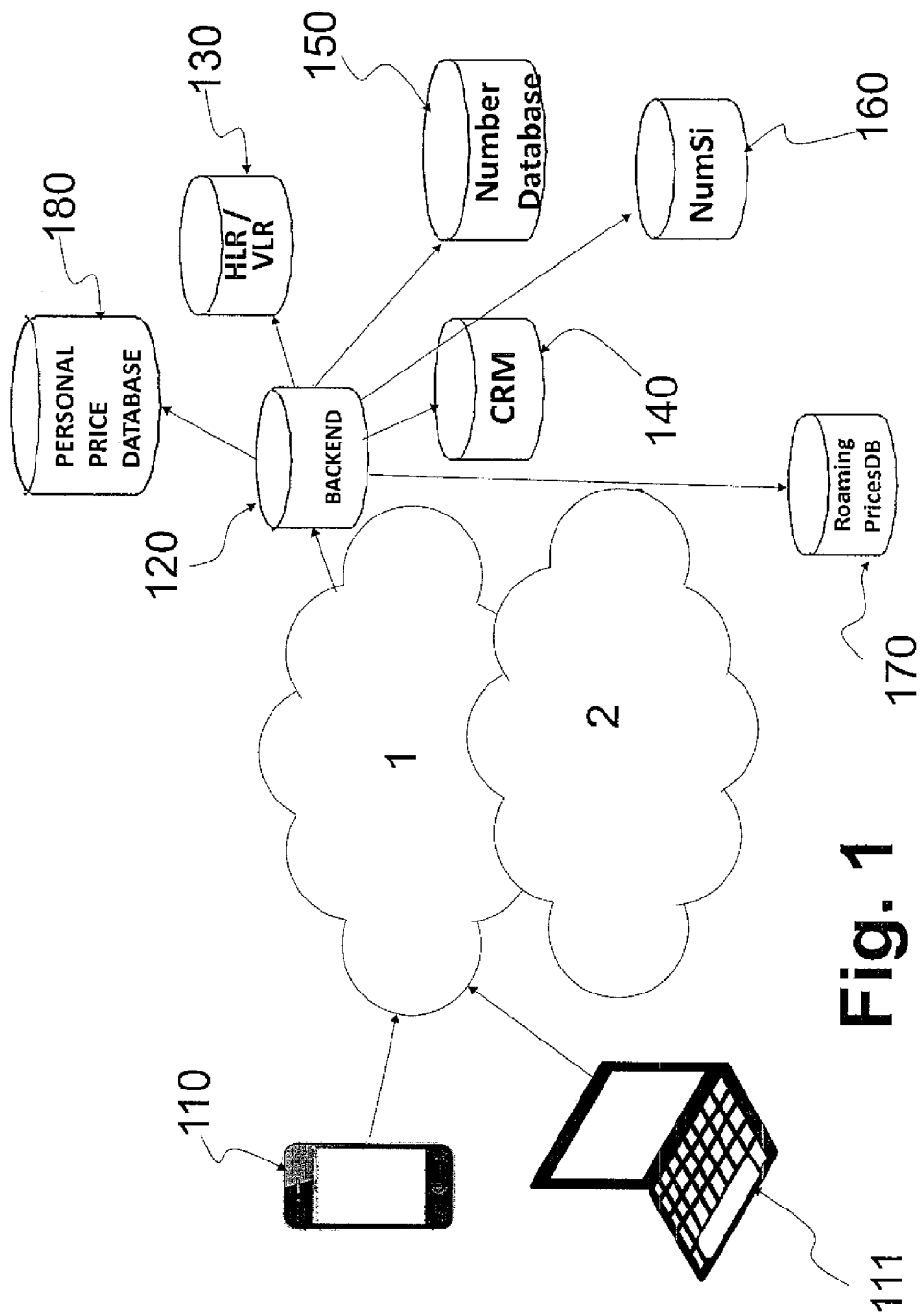
FIG. 1 shows an example of a system.

FIG. 1 illustrates an example of the present system. The system comprises a client device 110, 111. The client device 110, 111 may be a smart phone, a personal computer, or any intelligent device suitable for communication. The personal computer may be a fixed computer, a lap-top computer or a table computer. The client device 110, 111 may comprise a pricing application, stored e.g. on the (external of internal) memory of the client device or even in the Subscriber Identity Module (SIM). The pricing application is configured to operate e.g. with a contact book (a.k.a. phonebook) application, messaging application or dialer application of the client device 110, 111, either as being an application module of said applications or as being interfaced with said applications. The pricing application may also interface with the user. The system may also comprise a backend application 120. Whereas the pricing application interfaces with the user, the backend application is configured to act as an interface between the client-side pricing application and various operator systems, such as HLR/VLR (Home Location Register/Visitor Location Register) 130, CRM (Customer Relationship Management) 140, number database 150, billing, NumSi system (for number portability information) 160, directory systems, roaming prices database 170, a personal price database (180) etc. The backend application 120 may be resided on an operator server. The backend application 120 is configured to receive requests (i.e. pricing queries) from the pricing application, and to forward the requests to the aforementioned operator systems (130, 140, 150, 160, 170, 180). Instead of having the backend application 120 interfacing with the operator systems (130, 140, 150, 160, 170), the pricing application may operate directly with these systems.

The system comprises also at least one operator network 1, to which the user of the client device has been subscribed. The at least one operator network 1 may be GSM (Global System for Mobile communications), GPRS (General Packet Radio Service), UMTS (Universal Mobile Telecommunications System), CDMA (Code Division Multiple Access), W-CDMA (Wideband Code Division Multiple Access) network. The operator network 1 can also be Internet Protocol Network (IPv4, IPv6). It is appreciated that the operator network 1 comprises various means and devices that are typical to the network in question, e.g. access points, base stations, support nodes, etc., which are not described any further in the present disclosure.

The system may also comprise another operator network 2 that can be used for roaming. The other operator network 2 may also be GSM (Global System for Mobile communications), GPRS (General Packet Radio Service), UMTS (Universal Mobile Telecommunications System), CDMA (Code Division Multiple Access), W-CDMA (Wideband Code Division Multiple Access), LTE (Long Term Evolution) network or Internet Protocol Network (IPv4, IPv6).

Figure 2:
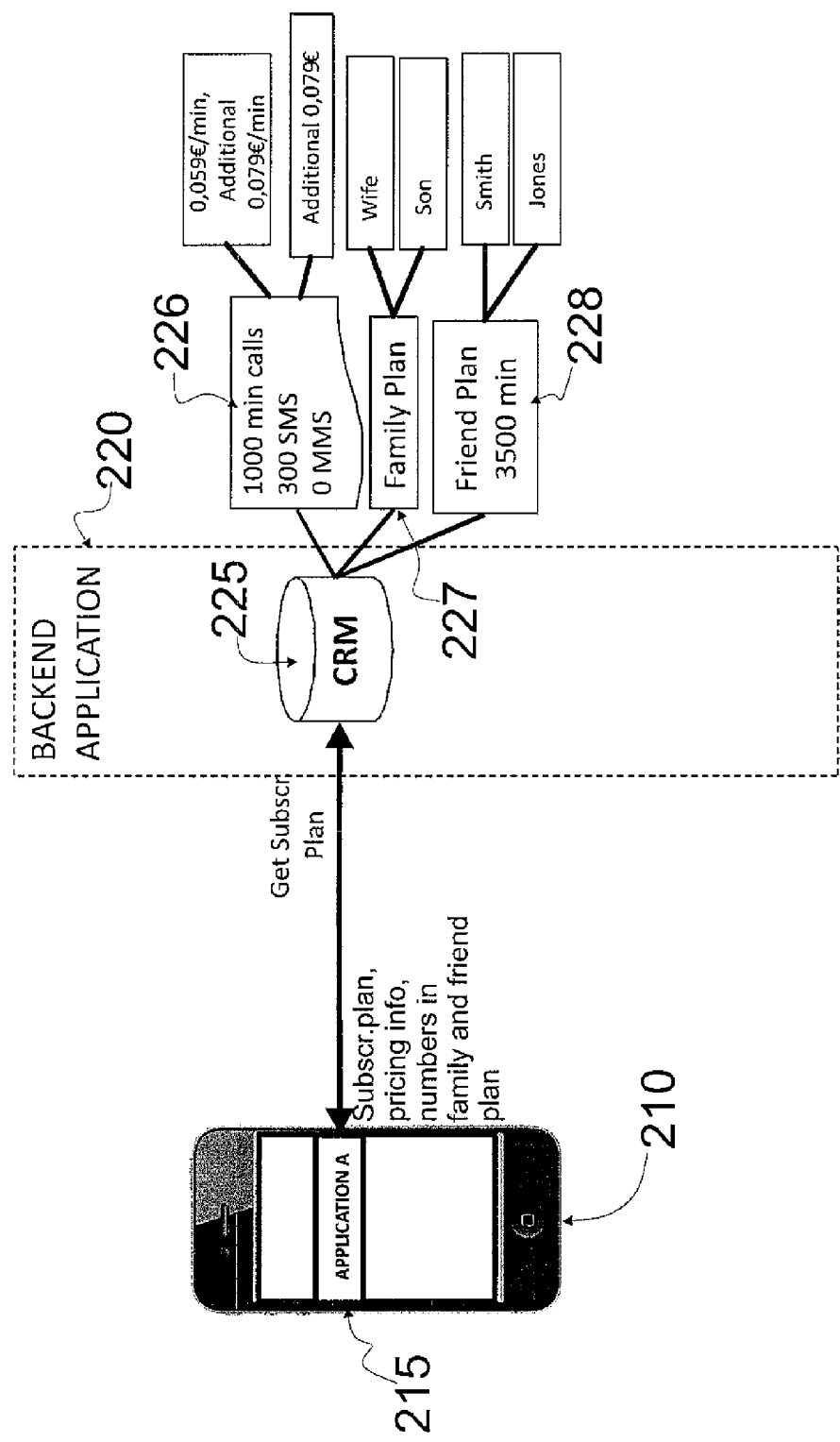
FIG. 2 shows an example for updating a contact book with the pricing information.

FIG. 2 illustrates an example of getting subscriber profile information. The client device 210 comprises a pricing application "Application A" 215 that negotiates "GET SUBSCR. PLAN" with a CRM 225 in order to retrieve subscription plan to the client device 210, which subscription plan relates to the user of the client device 210. The pricing query made by the pricing application 215 contains, in this example, a subscriber data of the user of the client device 210.

The CRM 225 of the operator stores various subscription plans and is capable of searching for the subscription plan by means of the subscriber data in the pricing query. The correct subscription plan may indicate that user's plan 226 comprises 1000 minutes for calls, 300 text messages (SMS, Short Message Service) and zero multimedia messages. In addition, the CRM 225 is capable of determining that calls outside the subscription plan will costs 0.059 €/minute and messages exceeding the number of 300 will cost 0.079 €. Further, the CRM 225 is configured to see that the user has also subscribed a family plan 227 including the numbers of his wife and son, and a friend plan 228 with 3500 minutes for calls, which friend plan comprises the numbers for friends Smith and Jones.

All this pricing information and the numbers being defined in the family and friend plan are retrieved from the CRM 225 to the pricing application 215 of the client device 210. The pricing application 215 is configured to go through the contact information in the contact book application of the client device 210 and to place the retrieved pricing data so that each contact in the contact book application may be displayed with an information relating to pricing. In this example, the pricing application 215 may communicate directly with the CRM 225, or through a backend application.

Figure 3:
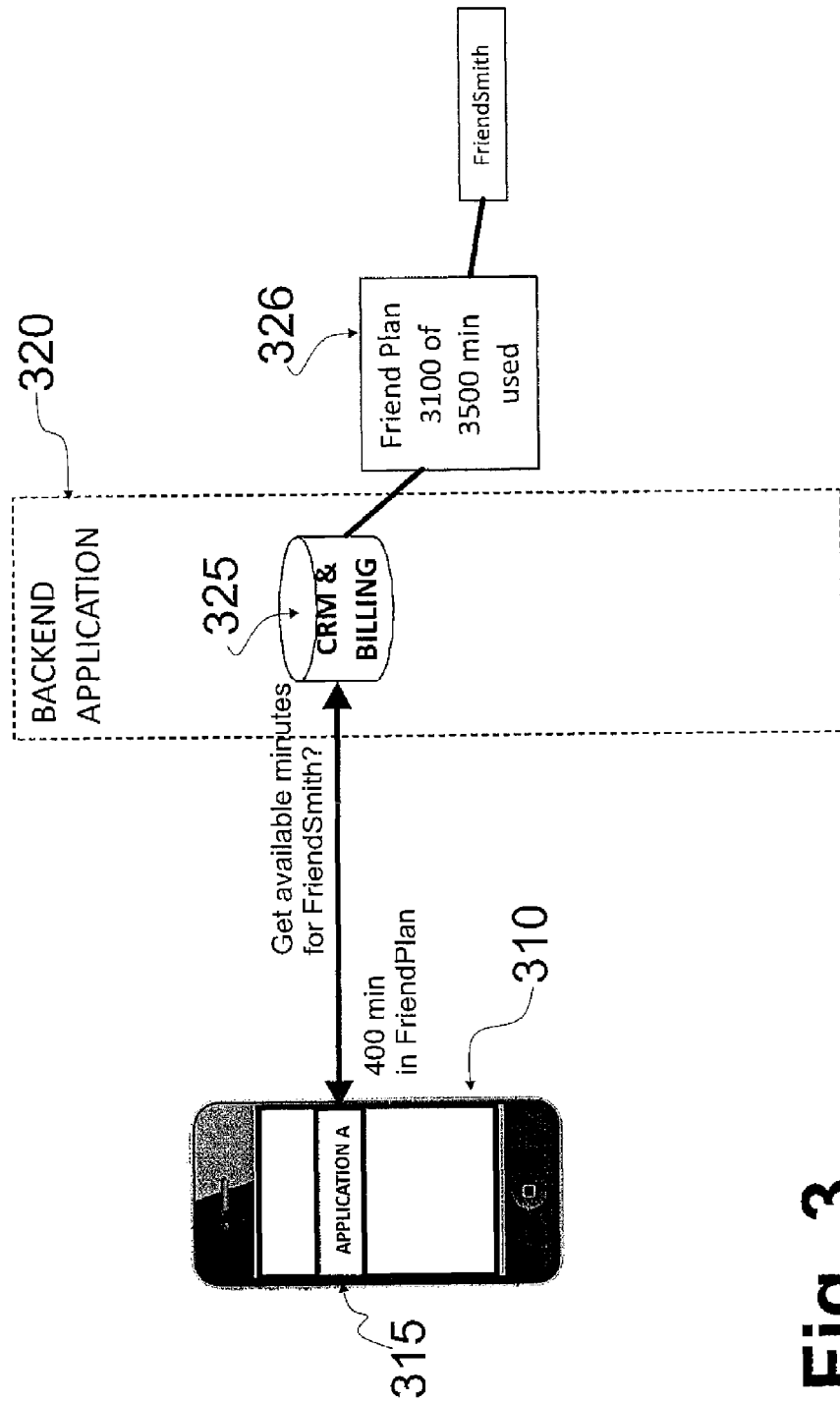
FIG. 3 shows an example for querying pricing information for a certain person.

FIG. 3 shows an example for querying how many calls are left for calling a friend. The pricing application "Application A" 315 in the client device 310 contacts a CRM and billing system 325 at the operator's in order to define how many minutes are left for calling to a friend being included in a friend plan 326 "GET AVAILABLE MINUTES FOR FRIENDSMITH". The pricing application deliver a query containing, in this example, a contact information in a form of a name for the friend "Friend Smith". The CRM and billing system 325 are configured to match Friend Smith to friend plan of the subscriber. Yet, further the CRM and billing system 325 are configured to determine that 3100 minutes of 3500 minutes have been used, and therefore there are still 400 minutes left for contacts appearing in the friend plan 326. It is to be noticed that said 400 minutes are shareable minutes between friends appearing in the Friend Plan. In this example, the pricing application 315 may communicate directly with the CRM and billing system 325, or through a backend application.

Figure 4:
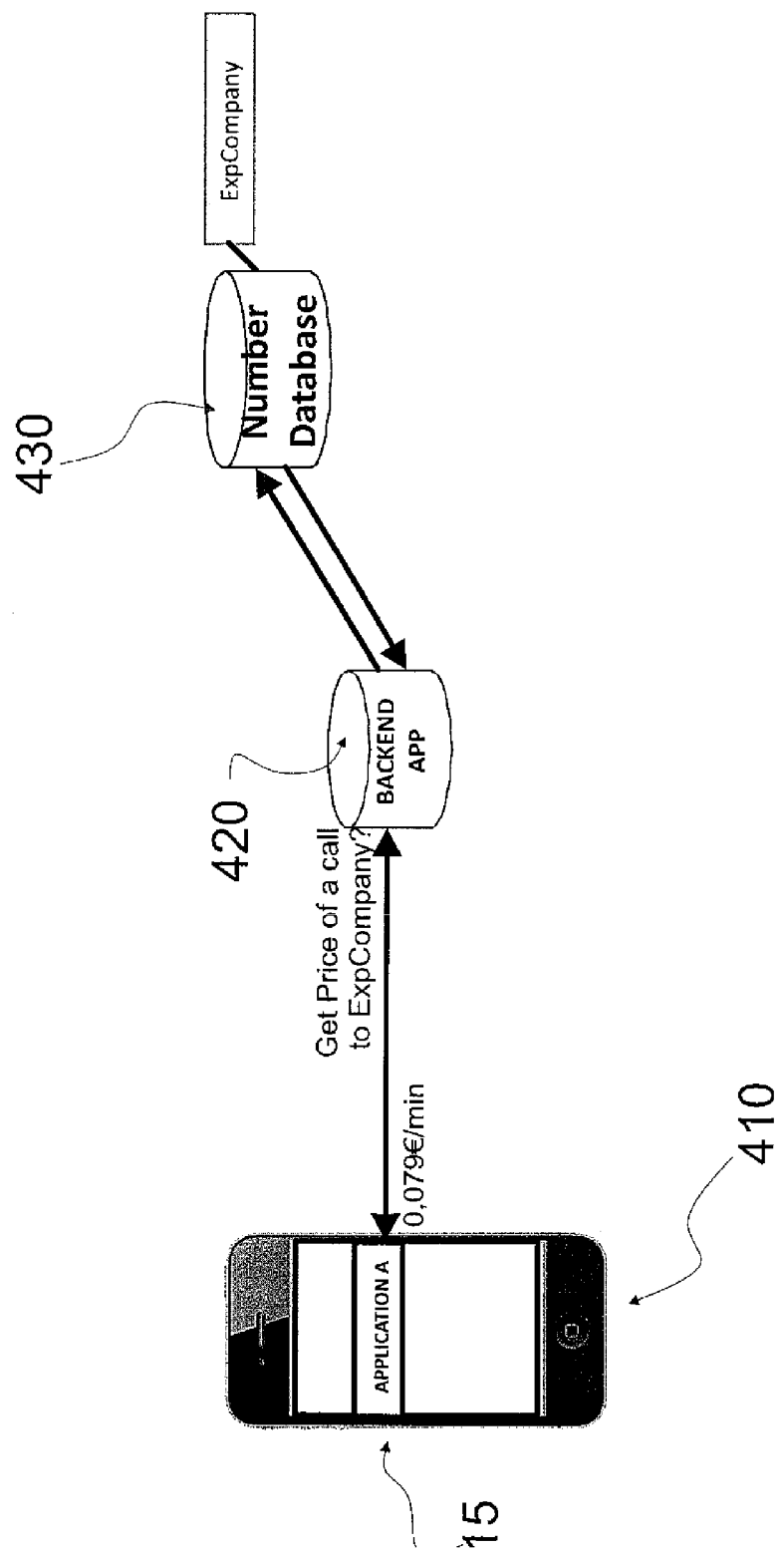
FIG. 4 shows an example for querying pricing information for a certain company.

FIG. 4 shows an example for querying a price for a call. The pricing application "Application A" 415 of the client device 410 contacts the backend application 420 in order to determine what a call to a certain company would cost "GET PRICE OF A CALL TO EXPCOMPANY". The pricing application 415 delivers a pricing query containing, in this example, a contact information in the form of company name. The backend application 420 finds out from a number database 430 by means of the company name that the company number belongs to the same operator network than the subscriber, and therefore a call to the company will cost 0.079 €/min. The price information is transferred to the client device 410. In this example, the pricing application 415 may communicate directly with the number database 430 or through a backend application 420.

Figure 5:
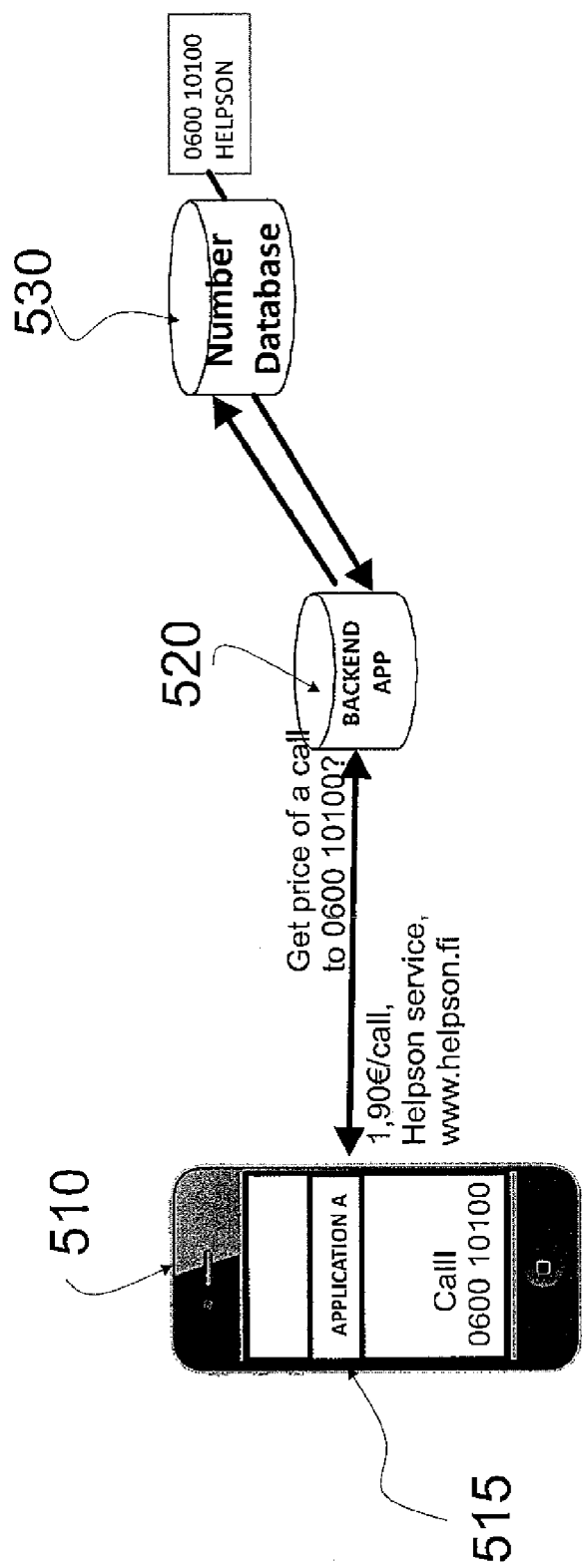
FIG. 5 shows an example for querying pricing information for a certain service.

FIG. 5 illustrates another example for querying a price for a call. In FIG. 5 the user wishes to know, what would a call to number 0600 10100 cost "GET PRICE OF A CALL TO 0600 10100". The pricing application "Application A" 515 delivers a query containing, in this example, a contact information in the form of telephone number. The backend application 520 determines from the number database 530 that the number is a service number, the cost of which is 1.90 €/call. This pricing information is transferred by the backend application 520 to the client device 510. The pricing information being transferred to the client device 510 may be incorporated with other information, such as an URL (Uniform Resource Locator). In this example, the pricing application 515 may communicate directly with the number database 530 or through a backend application 520.

Figure 6:
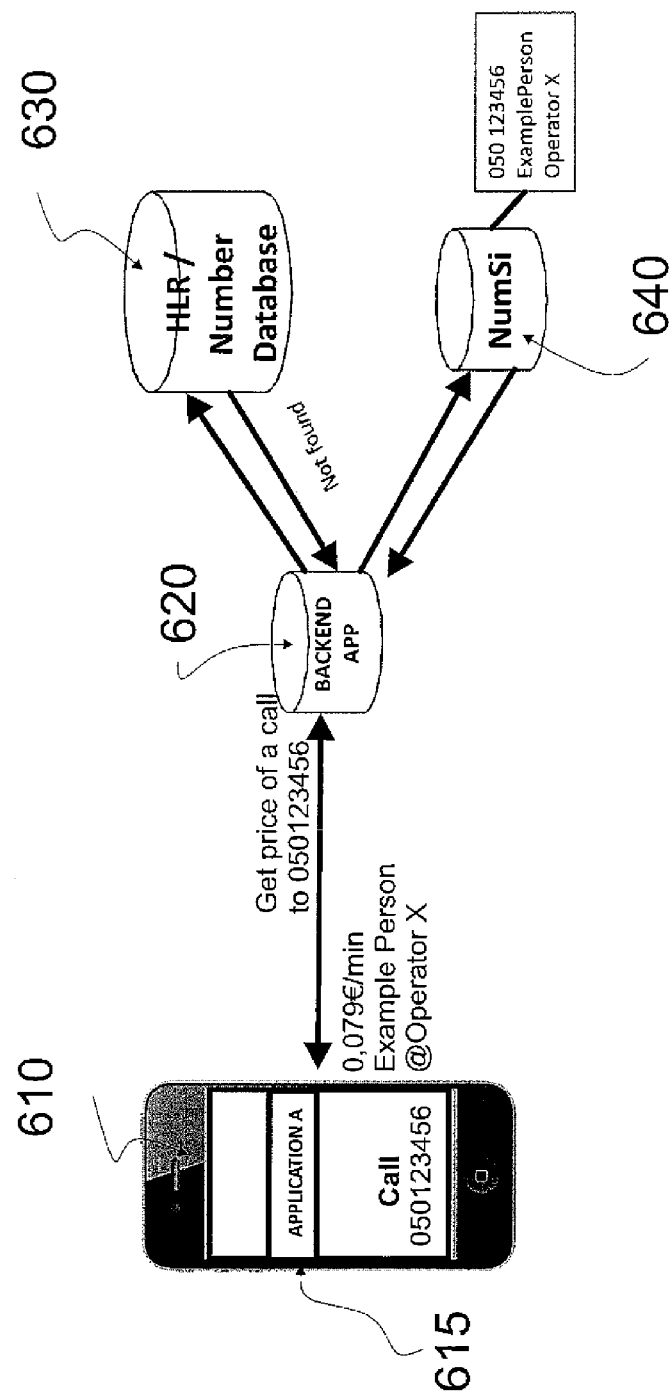
FIG. 6 shows another example for querying pricing information for a certain person.

FIG. 6 also illustrates an example for querying price for a call. In FIG. 6, the user wishes to know, what would a call to a number 050 123456 cost "GET PRICE OF A CALL TO 050123456". The pricing application "Application A" 615 delivers a pricing query containing, in this example, a contact information in the form of telephone number. The backend application 620 contacts the number database 630 in the home location register, and makes a query for said number. The number database 630 returns "NOT FOUND" to the backend application 620, which then contacts the system for number portability information 640 (NumSi). The NumSi system is aware of the number, and informs the backend application 620 that the number belongs to a person "EXAMPLE PERSON" subscribed to an operator X. The operator network X is not the same as the user's operator network, and therefore the cost of the call is 0.079 €. In this example, the pricing application 615 may communicate directly with the number database 630 and NumSi 640 or through a backend application 620.

Figure 7:
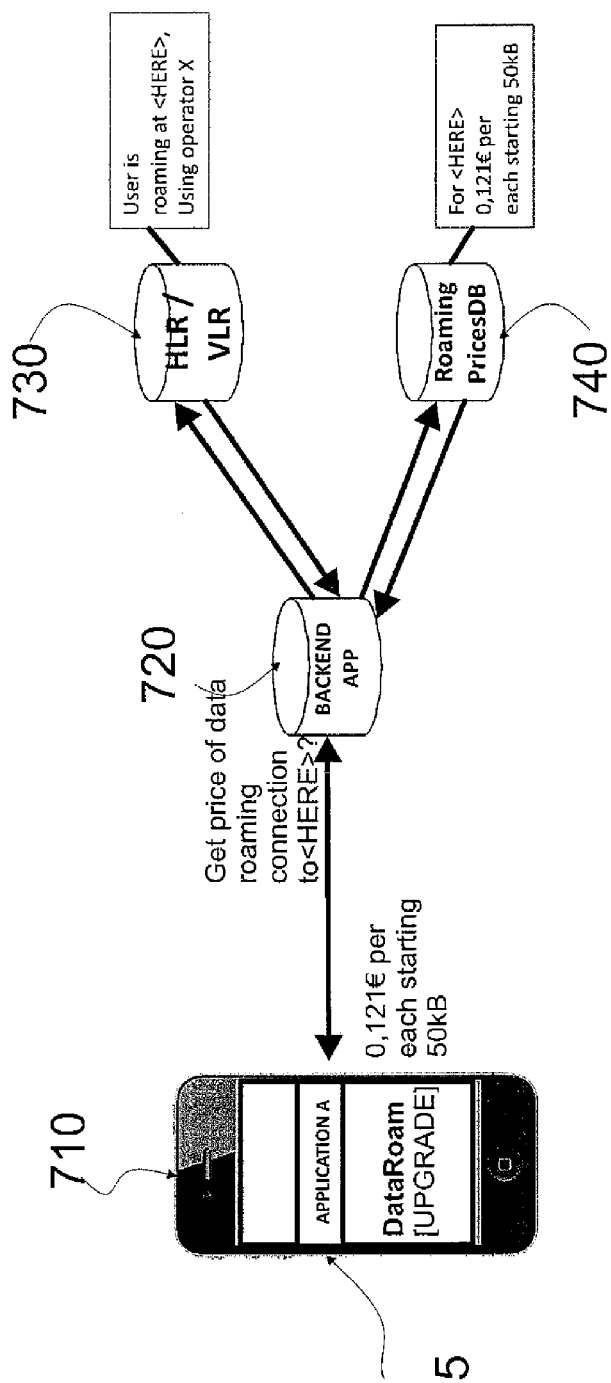
FIG. 7 shows an example for retrieving pricing information for a data transfer.

FIG. 7 illustrates and example for querying for a cost of a mobile data connection while roaming. The pricing application "Application A" 715 of the client device 710 contacts the backend application 720 to find out what the roaming data connection will cost for the network where the client device 710 is currently being roaming "GET PRICE OF DATA ROMAING CONNECTION TO <HERE>". <HERE> is an indication of a code of the current roaming network operator the user is connected to. In other words, the pricing application 715 delivers a pricing query containing, in this example, a contact information that relates to a location where the client device 710 can be contacted. By means of contact information <HERE>, the backend application 720 is able to determine from HLR/VLR register 730 where the user of the client device 710 is roaming and which operator the connection uses. After this, the backend application 720 is configured to check from the database for roaming prices 740, how much the roaming data connection will cost. The database 740 returns pricing information to the backend application 720, which forwards the information to the client device 710. The client device 710 is then capable of displaying that the connection will cost 0.121 € per each starting 50 kB. In this example, the pricing application 715 may communicate directly with the HLR/VLR 730 and roaming prices database 740 or through a backend application 720.

Figure 8:
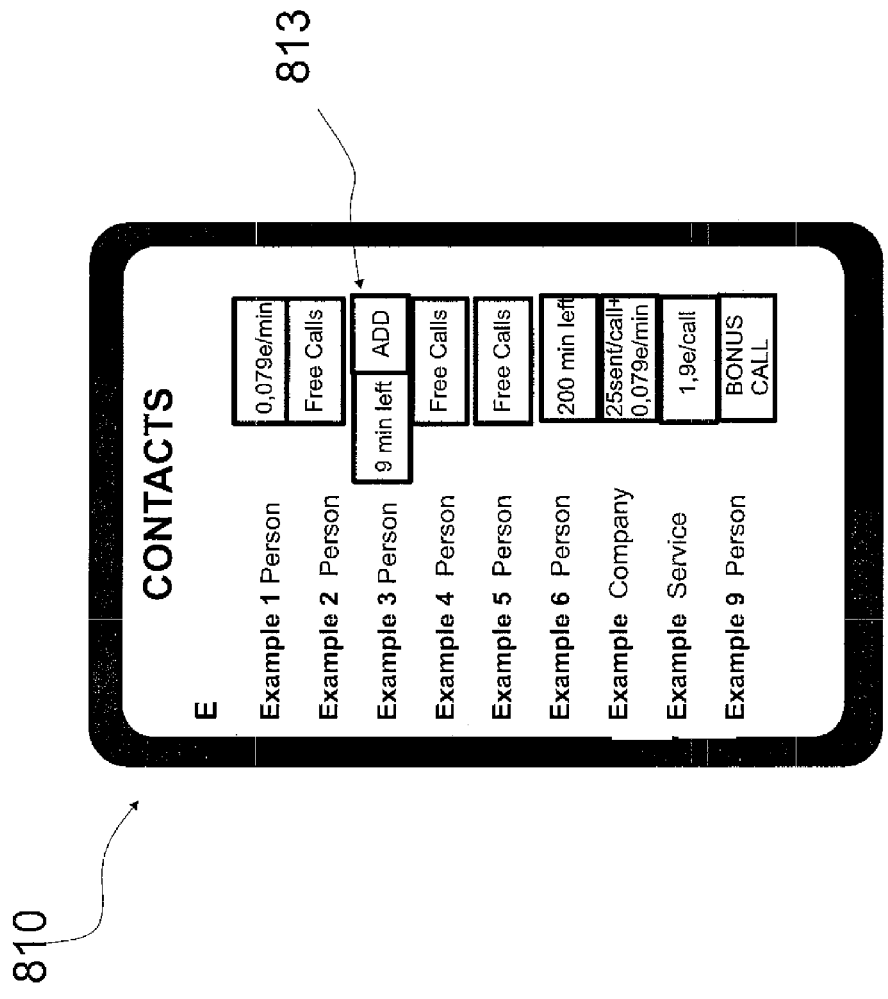
FIG. 8 shows an example of a view to a phone book with pricing information.

FIGS. 8-13 show, how the pricing information is displayed to the user in the client device. FIG. 8 illustrates a user interface of a phone book application being stored in a client device 810 and comprising contact information for persons, for a company and for a service. In this example, each contact comprises some kind of pricing information—e.g. that a call costs 0.079 €/min, that a call is free (e.g. when the contact belong to certain group), that a person belongs to a group plan that shares a certain amount of calling minutes, that a call to a certain person is processed as a bonus call—which pricing information has been retrieved according to the present solution (see FIGS. 2-7). In addition, costs to a company number as well as to a service number are displayed. In "Example 3 Person" a button "ADD" 813 is also displayed. The button 813 can be used for purchasing more minutes for calls targeted to this contact or to a group which the contact belongs to. This means that the client device is capable of upgrading subscriber's pricing database with respect of this person.

The pricing information for contact appearing in a contact book may be retrieved by one query (see FIG. 2). It is also possible to update one or more arbitrary connections separately.

Figure 9:
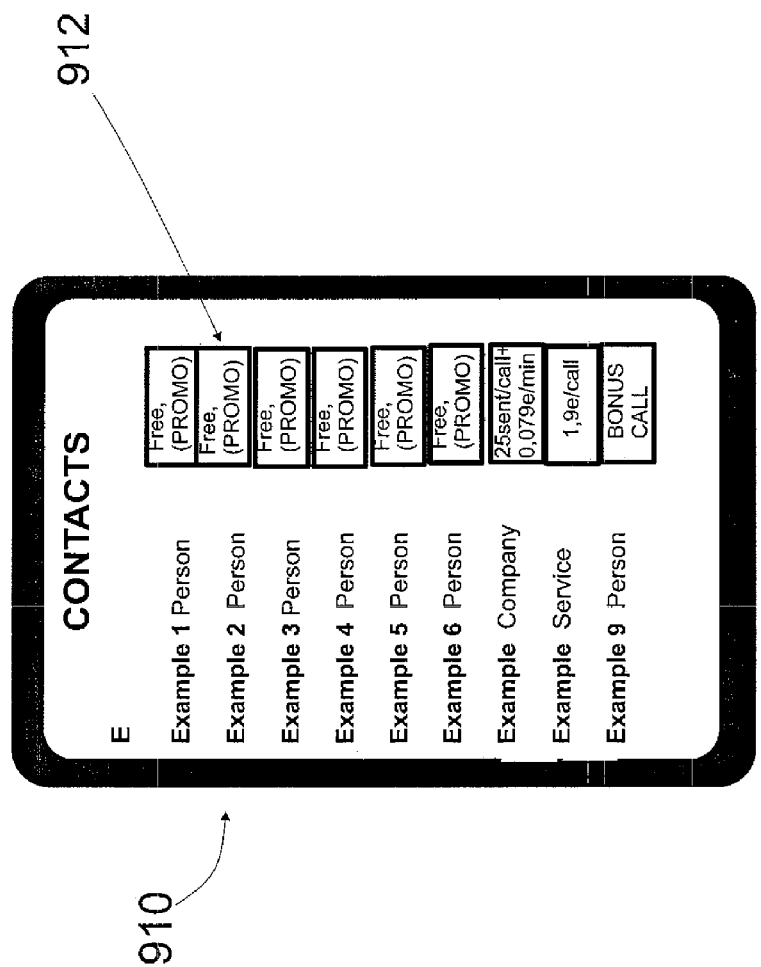
FIG. 9 shows another example of a view to a phone book with pricing information.

FIG. 9 shows another example for displaying the pricing information in the client device 910. However, in this example the person contacts are displayed with "Free (Promo)" indication 915. Such an indication can be used in a situation where the operator wants to have some special promotional rates for some occasions, whereby the pricing application is capable of showing the new promotional pricing in real time. Such a pricing information can be obtained from the operator system e.g. via a push-message. A price query from the pricing application may not be needed.

Figure 10:
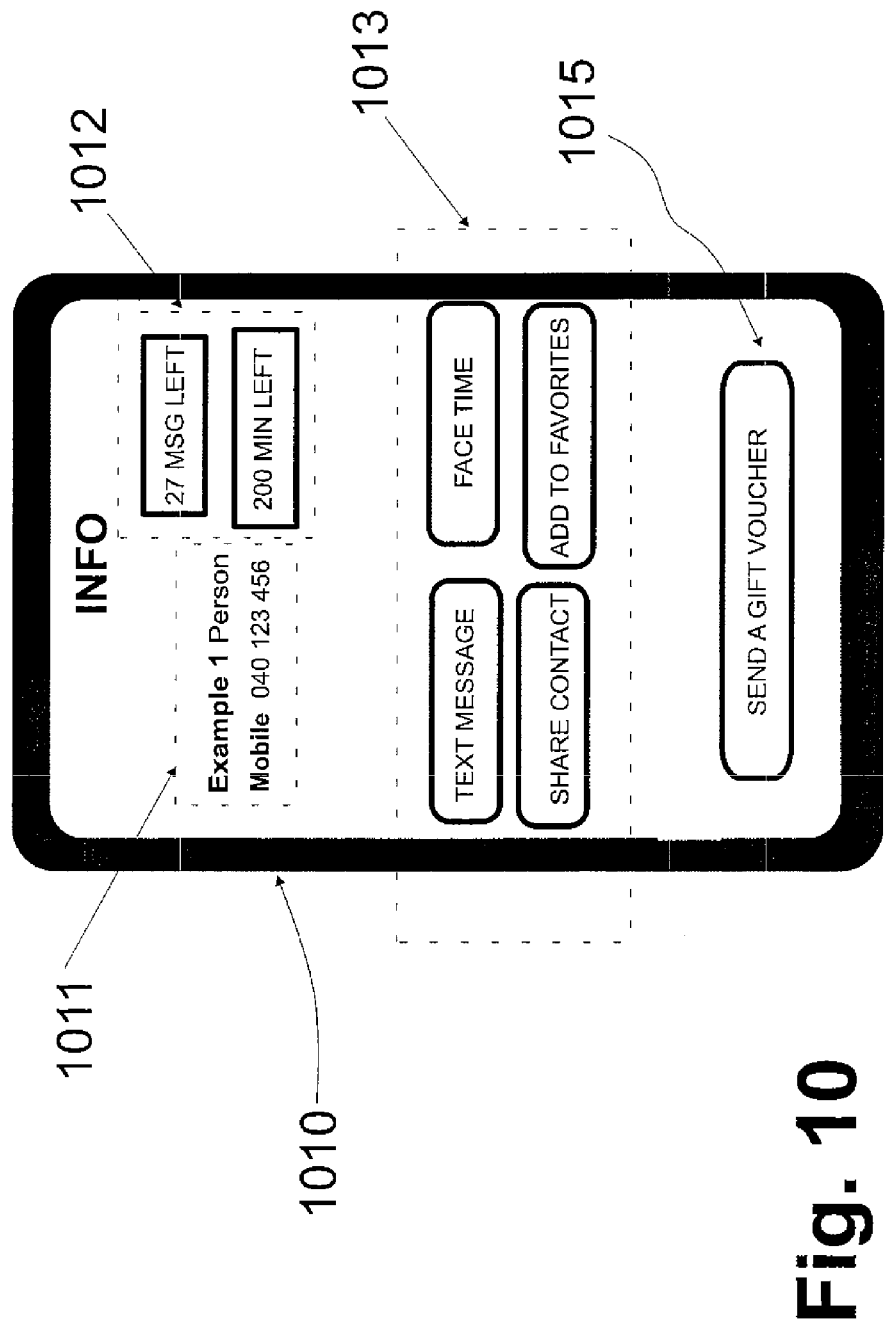
FIG. 10 shows an example of a view to a contact card with pricing information.

FIG. 10 illustrates an example of an additional feature for the present solution. In this example, the user of the client device 1010 can send a gift voucher 1015 to a certain contact. In FIG. 10, there is a view to a contact information (1011) of an example person. The view shows how many messages (1012) and how many minutes (1012) are left for the user to contact to said example person. In this view, actions 1013 that can be performed with the contact information are also shown in the client device 1010. In addition the view comprises a function 1015 for sending a gift voucher to this particular contact. The gift voucher may be in the form of "send 1000 minutes as a gift" or "donate my extra minutes to this person". The 1000 minutes of the first example would be charged from the user's subscription, and the extra minutes (in this example 200 min) would be reduced from the user's available minutes. This example therefore upgrades a pricing database of another user (i.e. Example 1 Person) that can be reached via the contact information 1011.

FIGS. 11a and 11b show examples for displaying pricing information when messages are being created. FIGS. 11a and 11b illustrate a user interface for creating a message in a client device 1110. In FIG. 11a, the pricing information 1112 shows that there are 56 messages left in the subscription plan. In FIG. 11b, on the other hand, the pricing information 1113 shows that the message will be sent for free. In these examples a keyboard (1116, 1117) (either visual or physical) is also shown. The keyboard does not necessarily have to be a qwerty keyboard as in this example, but a number based keyboard is also possible. Instead of the keyboard also other methods for inputting data can be used, which other methods can be based on speech recognition or handwriting. For completing and sending the message, a key "Send" (1114, 1115) can be pressed.

Figure 12:
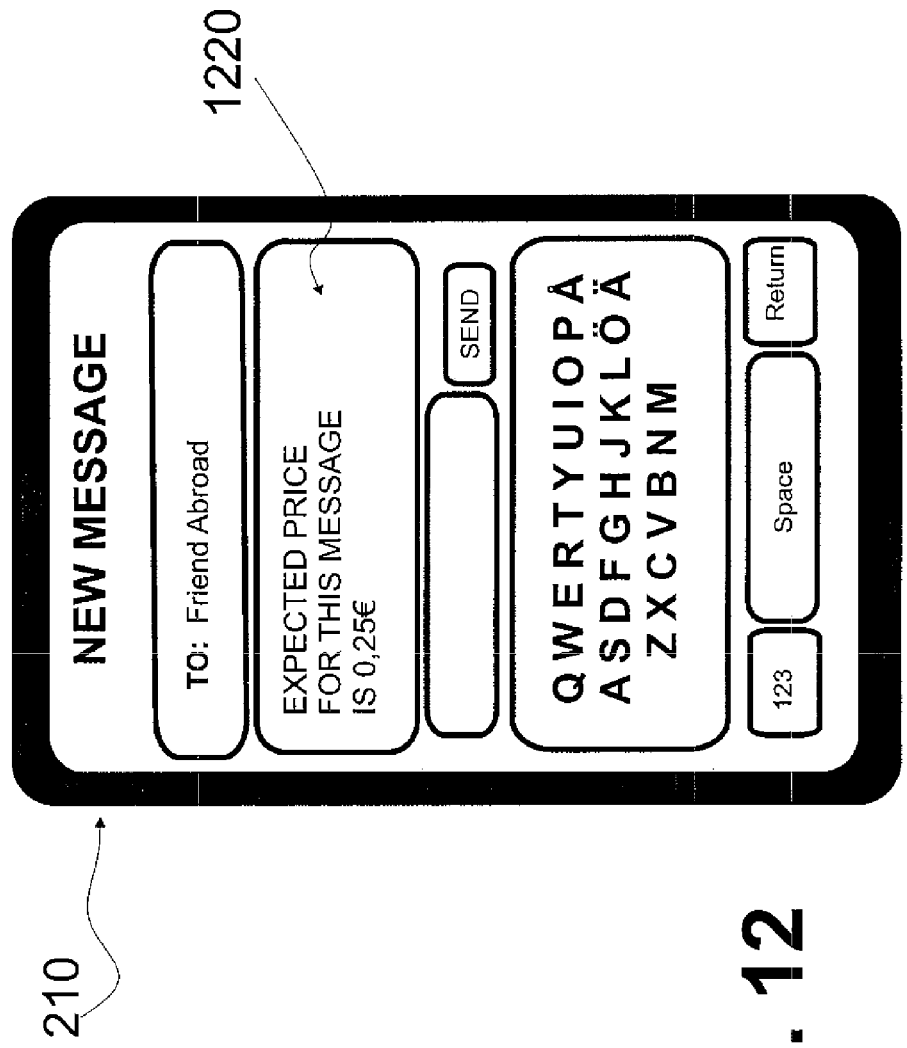
FIG. 12 shows an example for querying a price for sending a message.

FIG. 12 shows another example for displaying the pricing information when composing a message. Again, a user interface for message creation in the client device 1210 is shown. In this example, the target person for the message is living abroad. The pricing application may solve, how much sending a message would cost to this particular contact. The phone number of this person is +1-985-516-111, which is a number in USA. According to the present solution, the pricing application is capable of retrieving from the operator's database the price for sending a message to that number. Furthermore, the pricing application can check—with or without the backend application—whether the sender is currently roaming, and check roaming messaging pricing from user's operator database as well. After having these two prices, the pricing application can combine them to be shown to the user in a friendly and easily understandable way. The pricing application may also be capable of taking into account if the message (in this example, an SMS) is less than 160 characters and thus can be send as an one message, or whether it needs to be split into multiple messages, wherein the pricing application is capable of adjusting the price information dynamically. In this example, the pricing information is displayed on a field 1220. Additional information or selectable actions can be displayed on the user interface as well. For example, field 1220 could show an advertisement from the operator system "Buy abroad package, get 5 messages free".

Figure 13:
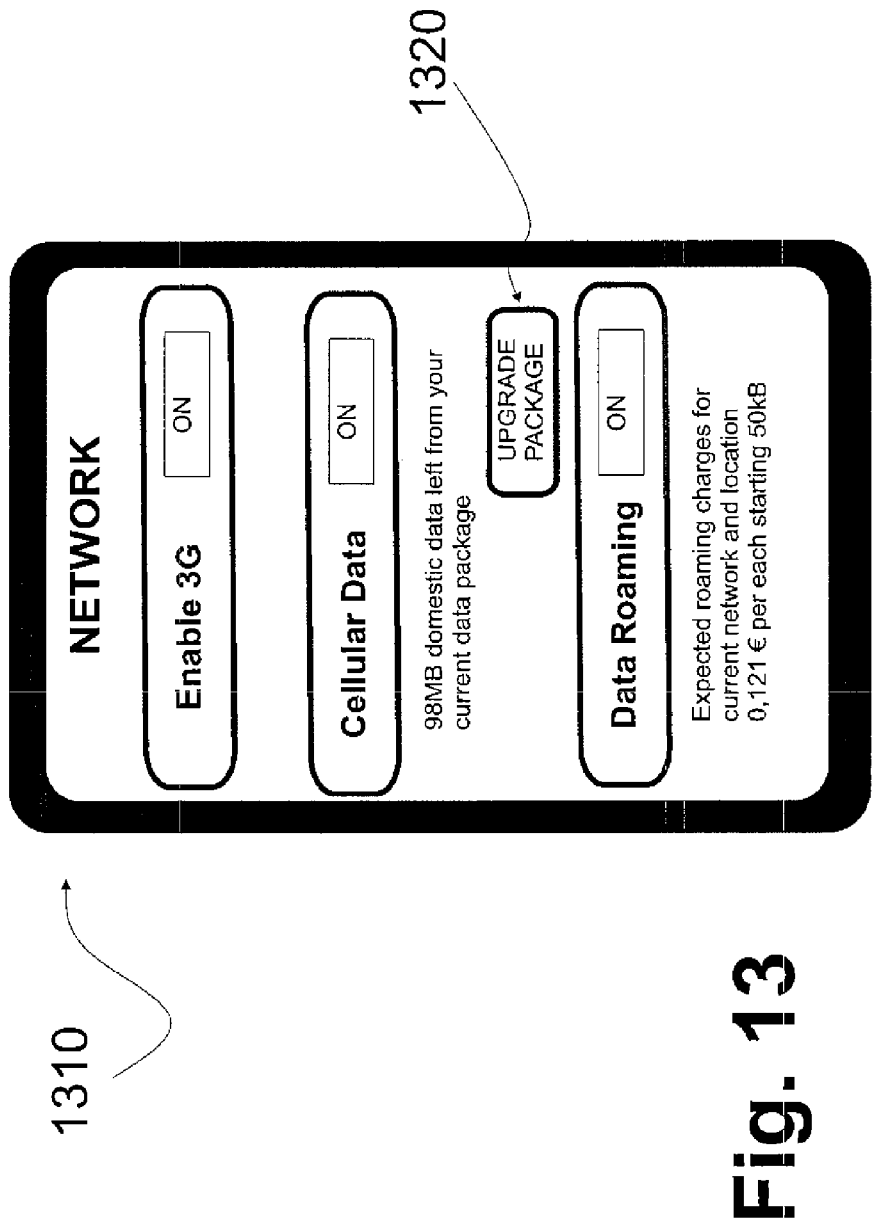
FIG. 13 shows an example for querying a price for data roaming.

FIG. 13 shows an example for displaying a data package info and balance in the client device 1310. The user often wishes to be aware on how much using the mobile data connection abroad will cost. Earlier it has been difficult to estimate, and also to know how much s/he has already consumed. The present solution provides means for determining this also. The application is configured to check the pricing from the operator roaming database (see also FIG. 7), based on the current roaming network, the user is using. The application may also keep track of sent/received data locally, and show the real-time pricing information to the user. Alternatively, the pricing application may also check—directly or via the backend application—the approximate data counters from the operator's billing database. In this example a functionality 1320 for upgrading the package is provided. By this, the user may increase the available amount of data in the data package.

FIGS. 14*a* and 14*b* show examples for searching numbers and displaying pricing information automatically when dialing. Both FIGS. 14*a* and 14*b* show a dial pad 1420 with a call function 1430 for the client device 1410. In FIG. 14*a*, the user has dialed a number 0600 10100 (1440), which is—by means of the present solution—automatically being determined to be a service number, the cost of which is 1.99 €/min+local network fee ("pvm") (1450). In FIG. 14*b*, the user has selected "MySpouse" (1440) from the contact book, whereupon the pricing application (optionally with the backend application) has determined the contact to be included in the family plan, whereby the call for this contact is free (1450).

The examples being disclosed above provide pricing information to a client device. There are various occasions when the pricing information can be delivered to the client device. For example at the time the user opens the contact book application, the pricing application contacts the backend application or operator systems for querying prices. The pricing application may also be configured to contact the backend application or operator system for price query purposes at the time a certain contact is selected (e.g. for messaging, for dialing, in the address book application) or defined (e.g. for messaging, for dialing, for address book application). Other configurations are possible as well. The pricing application may contact the backend application or operators systems for price update in the client device after a call is made or after a message has been sent or after a data has been transferred. In other words, the pricing information for the client device can be updated anytime when an action affecting the pricing data is performed. The update of the price information can also be performed at intervals of a certain time (e.g. 1 hour).

In the previous it is disclosed that the pricing application "contacts" the backend application or the operator system. However, it is appreciated that instead of active role of the client device's pricing application, also the operator systems may send pricing information to the client device for example right after it realizes a change in pricing or a change in a subscription. Yet further, in one embodiment the operator may create a personal price database for a subscriber at the time the subscription is made. Such a personal price database is maintained by the operator in realtime. Everytime an action affecting the price information is performed by the client device, the operator updates the personal price database. The data from the personal price database may be obtained by synchronizing the client device with the personal price database. This means that no additional price query from the client device is needed, but only a synchronization. This example has been illustrated in FIG. 15, showing a client device 1510, a pricing application 1515, a backend application 1520 and a CRM 1525 which are optional, and a price database 1530 with which the client device is synchronized to.

At the time a new number (not found from a phone book application) is dialed (for calling or messaging purposes), the pricing information query for that certain number can be made immediately after an operation indicating that the user has completed the dialing is performed. The operation indicating that the user has finished inputting numbers may include a key press of a certain button (visual or physical) in the client device or a waiting for a short moment.

The price information query can be performed via data communications, but also by means of short messages. The short messages may come up, if the data connection is not operating.

All the previous examples have shown how the present solution makes it possible to see right from the contact book application a pricing and subscription plan information related to the contact or number in question. The method and the system enable retrieving the right and up-to-date information, and displaying it in the contact book application of the end user device.

The various embodiments of the invention can be implemented with the help of computer program code that resides in a memory of a client device or a server, and causes the relevant apparatuses to carry out the invention. For example, a client device may comprise circuitry and electronics for handling, receiving and transmitting data, computer program code in a memory, and a processor that, when running the computer program code, causes the client device to carry out the various examples of the invention. Yet further, a server may comprise circuitry and electronics for handling, receiving and transmitting data, computer program code in a memory, and a processor that, when running the computer program code, causes the server to carry out the various examples of the invention.

It is obvious that the present invention is not limited solely to the above-presented embodiments, but it can be modified within the scope of the appended claims.

The invention claimed is:

1. A system comprising:
    a client device; and
    an operator system,
    wherein there exists a network connection between the client device and the operator system;
    wherein, as a response to a request from the client device, which request comprises contact information related to at least one contact, said contact information comprising a contact number and a connection type, wherein the connection type is one of a phone call, a short message, a multimedia message and a data transfer, the operator system is configured to:
        determine pricing information corresponding to the connection type of a contact number of said contact information from a subscription plan relating to the client device;
        deliver the pricing information from the operator system to the client device via the network connection to be displayed in the client device; and
        update the pricing information for the client device when said connection type relating to said contact number has completed in the client device.

2. The system according to claim 1, wherein the system is further configured to display the pricing information together with the contact information.

3. The system according to claim 1, further comprising: a backend application configured to retrieve the pricing information from the operator system.

4. The system according to claim 1, wherein the client device is configured to form a pricing query and to transmit the pricing query to the operator system.

5. The system according to claim 1, wherein the system is further configured to derive pricing information for contacts appearing in a phonebook application of the client device via received pricing information.

6. The system according to claim 1, wherein the system is further configured to derive pricing information for a contact appearing in a communication application of the client device.

7. The system of according to claim 6, wherein the communication application of the client device comprises one of a messaging application and a dialing application.

8. The system according to claim 1, wherein the system is further configured to synchronize the client device with the operator system to deliver the pricing information.

9. The system according to claim 1, wherein the contact action relating to the contact information comprises making a call, sending a message, or transferring data to one or more of the at least one contact using the contact information.

10. An apparatus comprising:
a network connection to a client device comprising contact information of at least one contact, said contact information comprising a contact number and a connection type, wherein said connection type is one of a phone call, a short message, a multimedia message and a data transfer;
wherein, as a response to a request from the client device, which request comprises contact information related to the at least one contact, the apparatus is configured to:
determine pricing information corresponding to the connection type of a contact number of said contact information from a subscription plan relating to the client device;
deliver the pricing information to the client device via the network connection to be displayed in the client device; and
update the pricing information for the client device when said connection type relating to said contact number has completed in the client device.

11. A client device comprising:
a network connection to an operator system, the client device comprising contact information of at least one contact, said contact information comprising a contact number and a connection type, wherein said connection type is one of a phone call, a short message, a multimedia message and a data transfer;
wherein the client device is configured to:
deliver a request comprising contact information related to the at least one contact to the operator system;
receive pricing information from the operator system via the network connection, the pricing information relating to the connection type of a contact number of said contact information related to the at least one contact;
display the pricing information relating to the contact information; and
contact the operator system for updating the pricing information when said connection type relating to said contact number has completed.

12. The client device according to claim 11, further comprising: a network connection to the operator system via a backend application.

13. The client device according to claim 11, wherein the client device is further configured to form a pricing query and to transmit the pricing query to the operator system.

14. The client device according to claim 11, wherein the client device is further configured to derive pricing information for contacts appearing in a phonebook application of the client device via received pricing information.

15. The client device according to claim 11, wherein the client device is further configured to derive pricing information for a contact appearing in a communication application of the client device.

16. The client device according to claim 15, wherein the communication application of the client device comprises one of a messaging application and a dialing application.

17. The client device according to claim 11, wherein the client device is further configured to upgrade a pricing database of a user of the client device or of another user being reachable via the contact information.

18. The client device according to claim 11, wherein the client device is configured to upgrade the pricing information relating to each of the at least one contact.

19. The client device according to claim 18, wherein upgrading the pricing information includes sending a gift voucher to another user that can be reached via the contact information.

20. A method for providing pricing information to a client device from an operator system via a network connection, comprising:
determining, as a response to a request from the client device, which request comprises contact information related to at least one contact, wherein said contact information comprises a contact number and a connection type and wherein said connection type is one of a phone call, a short message, a multimedia message and a data transfer, pricing information corresponding to the connection type of a contact number of said contact information from a subscription plan relating to the client service;
delivering a pricing information query from the operator system to the client device via the network connection to be displayed in the client device; and
updating the price information for the client device when a contact action relating to the connection type of the contact number has completed in the client device.

* * * * *